(12) United States Patent
Magno

(10) Patent No.: US 12,127,706 B2
(45) Date of Patent: Oct. 29, 2024

(54) TWO-STAGE WATER BOILER FOR A HOT BEVERAGE VENDING MACHINE

(71) Applicant: EVOCA S.P.A., Milan (IT)

(72) Inventor: Alessandro Magno, Milan (IT)

(73) Assignee: EVOCA S.P.A., Milan (IT)

( * ) Notice: Subject to any disclaimer, the term of this patent is extended or adjusted under 35 U.S.C. 154(b) by 57 days.

(21) Appl. No.: 17/292,509

(22) PCT Filed: Nov. 18, 2019

(86) PCT No.: PCT/IB2019/059882
§ 371 (c)(1),
(2) Date: May 10, 2021

(87) PCT Pub. No.: WO2020/100123
PCT Pub. Date: May 22, 2020

(65) Prior Publication Data
US 2021/0393076 A1    Dec. 23, 2021

(30) Foreign Application Priority Data

Nov. 16, 2018    (IT) ........................ 102018000010398

(51) Int. Cl.
*A47J 31/54*    (2006.01)
*F24H 1/18*    (2022.01)
(52) U.S. Cl.
CPC ............ *A47J 31/545* (2013.01); *F24H 1/185* (2013.01)

(58) Field of Classification Search
CPC ....... A47J 31/542; A47J 31/545; F24H 1/101; F24H 1/105; F24H 1/185; F24H 1/202; F24H 9/1818; F24H 9/2021; F24H 9/2028
See application file for complete search history.

(56) References Cited

U.S. PATENT DOCUMENTS

| 5,367,607 | A | 11/1994 | Hufnagl et al. |
| 2015/0226452 | A1* | 8/2015 | Adobati ................ F24H 9/0021 392/485 |
| 2017/0035240 | A1 | 2/2017 | Tanida |
| 2017/0227253 | A1* | 8/2017 | Chen ..................... F24H 9/2014 |
| 2018/0231258 | A1* | 8/2018 | Armstrong .............. F28D 7/024 |
| 2020/0154940 | A1* | 5/2020 | Scotti ...................... F24H 1/202 |

FOREIGN PATENT DOCUMENTS

| EP | 2893265 | 7/2015 |
| WO | 2018220552 | 12/2018 |

OTHER PUBLICATIONS

International Search Report and Written Opinion International Application No. PCT/IB2019/059882 mailed Mar. 13, 2020.

\* cited by examiner

*Primary Examiner* — Justin C Dodson
(74) *Attorney, Agent, or Firm* — Dorsey & Whitney LLP

(57) ABSTRACT

A two-stage water boiler for a hot beverage vending machine, comprising a storage water heater and a continuous-flow water heater fluidically connectable in series; wherein the storage water heater is configured to contain water at atmospheric pressure, and the continuous-flow water heater is configured to be supplied, through a water pump, with water drawn from the storage water heater.

6 Claims, 2 Drawing Sheets

TWO-STAGE WATER BOILER FOR A HOT BEVERAGE VENDING MACHINE

PRIORITY CLAIM

This patent application is a U.S. National Stage of PCT International Application No. PCT/IB2019/059882 filed on 18 Nov. 2019, which claims priority to Italian Patent Application No. 102018000010398 filed on 16 Nov. 2018-16 Nov. 2018, the disclosure of each of which is incorporated by reference.

TECHNICAL FIELD OF THE INVENTION

The present invention is related to a two-stage water boiler for a hot beverage vending machine.

In particular, the present invention is related to a two-stage water boiler of the type comprising a water tank designed to be connected, normally, to the water mains; a first water heating device to heat the water in the water tank to a first temperature; a tubular body mounted inside, and hydraulically connected in series to, the water tank to receive water from the water tank and to supply the water outside the boiler; and a second water heating device to heat the water flowing through the tubular body to a second temperature higher than the first temperature.

BACKGROUND

Generally, the water tank comprises a cup-shaped body closed by a lid, and is filled with water by a water pump arranged between the water mains and the water tank itself.

Since the water tank is a pressurised water tank, the known two-stage water boilers of the type described above have some drawbacks mainly due to the fact that both the water tank and the tubular body are subjected to relatively high forces. Consequently, the water tank is to be designed and built to withstand the forces generated by the pressurised water therein and the tubular body is to be designed and built to withstand both the forces generated by the pressurised water therein and the forces generated by the pressurised water in the water tank.

It follows, from the above, that the water tank and the tubular body are relatively complex and expensive and that the cup-shaped body and the lid must be coupled together in a fluid-tight manner.

OBJECT AND SUMMARY OF THE INVENTION

The object of the present invention is to provide a two-stage water boiler for a hot beverage vending machine that is free of the above-described drawbacks and that is simple and inexpensive to implement.

According to the present invention, a two-stage water boiler for a hot beverage vending machine is provided.

The present invention further relates to a water boiler assembly for a hot beverage vending machine.

According to the present invention, a water boiler assembly for a hot beverage vending machine is provided.

DETAILED DESCRIPTION OF PREFERRED EMBODIMENTS OF THE INVENTION

Figure 1:
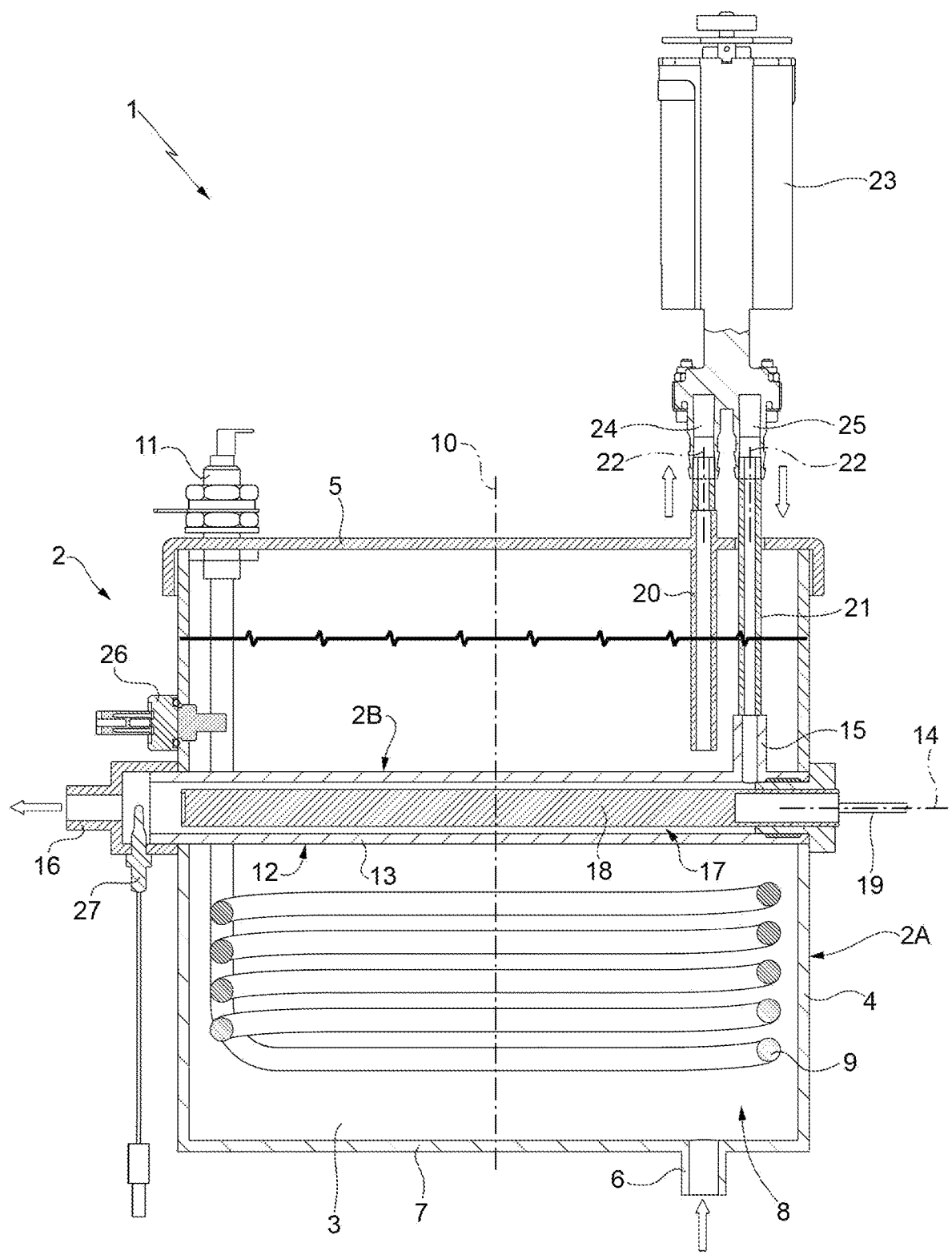
FIG. 1 shows a cross-section of a preferred embodiment of the two-stage water boiler of the present invention.

The present invention will now be described in detail with reference to the attached figures in order to allow a skilled person to produce and use it. Persons skilled in the art will be able to implement various modifications to the embodiments described herein and the general principles disclosed herein could be applied to other embodiments and applications without departing from the scope of the present invention, as disclosed in the appended claims. Accordingly, the present invention is not to be limited in scope to the embodiments described and illustrated herein, but is to be accorded with the widest scope consistent with the principles and features disclosed and claimed herein.

With reference to the attached figures, reference numeral 1 indicates, as a whole, a water boiler assembly for a hot beverage vending machine (not shown) for dispensing hot beverages, for example different types of coffee, tea, or hot chocolate.

The water boiler assembly 1 comprises a two-stage water boiler 2 for supplying pressurised hot water to a hot beverage dispenser assembly (not shown) of the beverage vending machine.

As will be described in greater detail below, the two-stage water boiler 2 comprises two heaters: a storage water heater 2A and a continuous-flow water heater 2B, which are arranged in series, in the order mentioned according to the flow of water through the two-stage water boiler 2, and are designed to implement the two water heating stages.

In particular, the two-stage water boiler 2 comprises a water tank 3 including a cup-shaped body 4 and a lid 5 for closing the cup-shaped body 4.

The water tank 3 is provided with an inlet connection 6, which is preferably, but not necessarily, formed in a bottom wall 7 of the cup-shaped body 4, and is connectable to a water source (not shown), in particular the water mains, to receive cold water. The water source and the water tank 3 are connected to each other via a hydraulic circuit (not shown), preferably but not necessarily without water pumps.

The water tank 3 is an atmospheric pressure water tank with a volume greater than the volume of water contained therein.

The storage water heater 2A comprises, in addition to the water tank 3, a first water heating device 8 arranged in the cup-shaped body 4 to heat the water in the water tank 3 to a temperature higher than the temperature of the water supplied by the water source at the inlet connection 6.

Conveniently, the water heating device 8 is in the form of an electrical resistance 9 which, in the example shown in FIG. 1, is substantially helically wound around a longitudinal axis 10 of the water tank 3 and is electrically powered via an electrical connector 11 mounted through the lid 5.

The continuous-flow water heater 2B is arranged in the storage water heater 2A and is provided with an associated second water heating device 17 to heat the water that, during operation, flows through the storage water heater 2B.

Preferably, the continuous-flow water heater 2B comprises a tubular body 12 including a sleeve 13 extending, in the cup-shaped body 4, above the resistance 9, and has a longitudinal axis 14 arranged transversally to the axis 10.

The sleeve 13 has an inlet connection 15 to receive the water from the water tank 3 and an outlet connection 16 to supply the water out of the boiler 2. The inlet connection 15 and the outlet connection 16 are arranged at the respective end portions of the continuous-flow water heater 2B.

In other words, the water tank 3 and the tubular body 12 are hydraulically connected in series and, hence, the inlet connection 6, through which the water is supplied to the storage heater 2A, defines the water inlet of the two-stage water boiler 2, and the outlet connection 16, through which the water outflows from the continuous-flow water heater 2B, defines the pressurised water outlet of the two-stage water boiler 2.

The water heating device 17 comprises an electrical resistance 18, which is arranged in the sleeve 13, coaxially to the axis 14, and is electrically powered via an electrical connector 19 extending through the cup-shaped body 4.

The two-stage water boiler 2 further comprises a suction duct 20 to suck water from the storage water heater 2A, and a delivery duct 21 to supply water into the continuous-flow water heater 2B.

The water boiler assembly 1 further comprises a water pump 23 arranged outside the two-stage water boiler 2 to suck the atmospheric pressure water from the storage water heater 2A through the suction duct 20 and to supply the pressurised water to the continuous-flow water heater 2B through the delivery duct 21.

In the example shown in FIG. 1, the water pump 23 is arranged over the two-stage water boiler 2, and the suction duct 20 and the delivery duct 21 are arranged opposite to the resistance 9 with respect to the sleeve 13, extend through the lid 5, and have their respective longitudinal axes 22 extending in directions substantially transverse to the axis 14 and, preferably, parallel to each other.

The suction duct 20 has a first end connected with the water tank 3 and a second end connected to a suction side 24 of the water pump 23.

The delivery duct 21 has a first end connected to a delivery side 25 of the water pump 23, and a second end fluid-tightly coupled to the inlet connection 15 of the tubular body 12.

Figure 2:
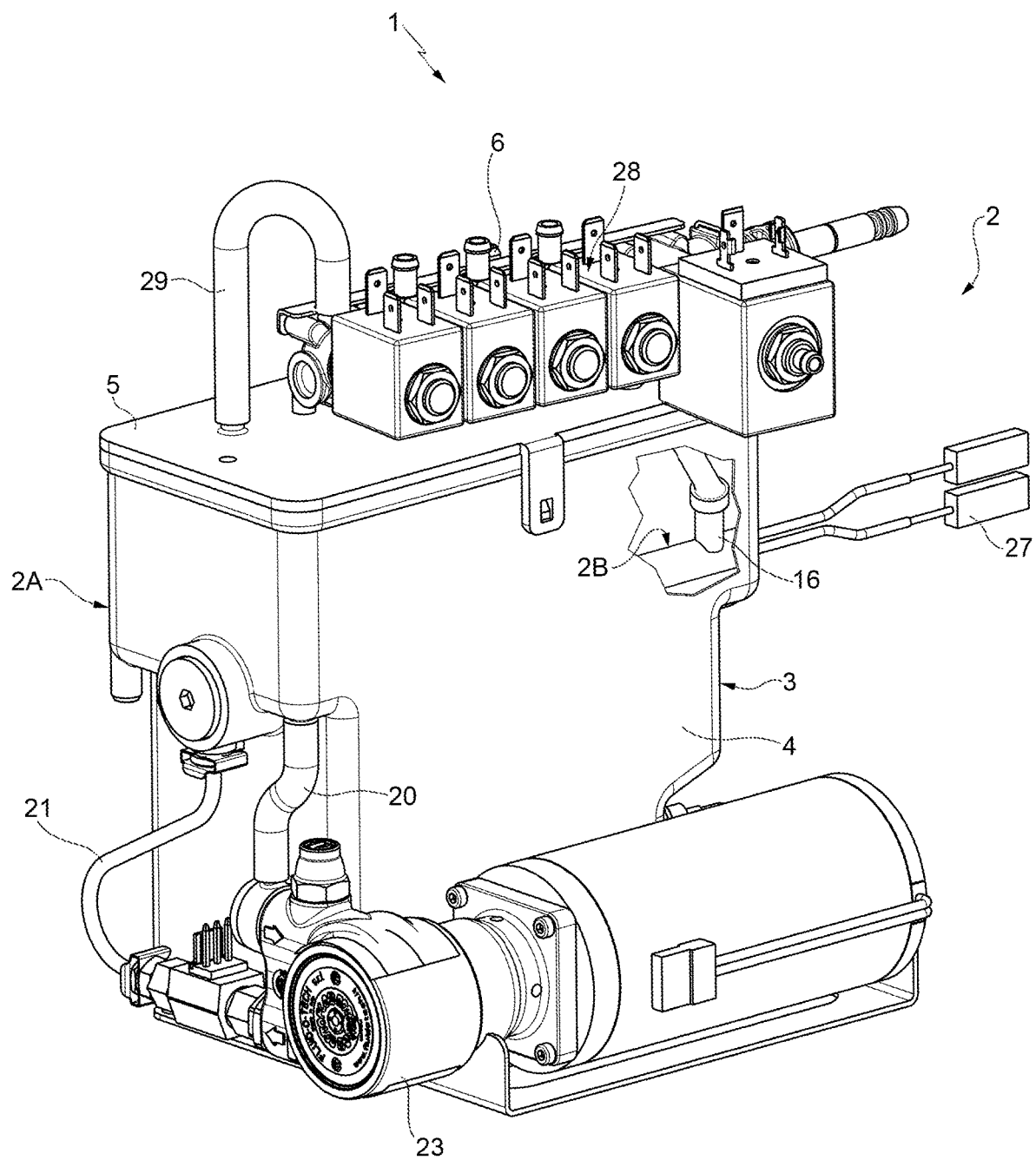
FIG. 2 is a perspective view, with parts removed for clarity, of a different embodiment of the two-stage water boiler of the present invention.

FIG. 2 shows a different embodiment of the two-stage water boiler 2 of the present invention, wherein the water pump 23 is arranged next to, and at the base of, the water tank 3. In this case, the suction duct 20 has an inlet arranged in the water tank 3, below the continuous-flow water heater 2B, and extends almost completely outside the water tank 3 up to the suction side of the water pump 23. The delivery duct 21 is in the form of a flexible pipe that extends outside the water tank 3, from the delivery side of the water pump 23 up to one end of the tubular body 12, protruding from a side wall of the cup-shaped body 4.

The embodiment shown FIG. 2 differs from the embodiment shown in FIG. 1 also in that the inlet connection 6 is arranged through the lid 5 of the storage heater 2A, and in that the outlet connection 16 is not arranged at one end of the tubular body 12, outside the water tank 3, but at one end of the tubular body 12 in the water tank 3 and fluidically communicates with the inlet of a valve assembly 28 designed to supply the pressurised hot water to various functional assemblies of the vending machine and to enable the recirculation of water into the water tank 3 through a pipe 29. Preferably, the valve assembly 28 is of the type described in WO 2018/220552, to the Applicant, to which reference may be made for a more detailed description.

The water boiler assembly 1 is also provided with a first temperature sensor 26 to measure the temperature of the water in the water tank 3, and a second temperature sensor 27 to measure the temperature of the water flowing in the outlet connection 16 of the tubular body 12.

According to a further embodiment not shown, the water pump 23 is immersed in the water tank 3 and the suction duct 20 and the delivery duct 21 are arranged entirely in the water tank 3.

During operation, cold water is supplied from the water source to the water tank 3 through the inlet connection 6 so that the volume of water contained inside the water tank 3 is less than the volume of the water tank 3 and, resultingly, the water tank 3 is substantially at atmospheric pressure. In any case, the volume of water maintained in the water tank 3 is to be such that the free surface of the water is always above the inlet of the suction duct 20 through which the water is supplied to the water pump 23. Preferably, the free surface of the water in the water tank 3 should also be maintained above the tubular body 12 so that the latter is completely immersed in the hot water.

The water in the water tank 3 is heated by the heating device 8 and maintain at a certain temperature T1. In response to the selection of a beverage from a user, the water pump 23 is operated to suck a certain amount of water from the water tank 3 and to supply it, under pressure, through the continuous-flow water heater 2B up to the outlet connection 16.

The water heating device 17 of the continuous-flow water heater 2B is controlled, in terms of switching on and off, lengths of the operation periods, and output power, are based on the final temperature required for the selected beverage. If, for example, the required temperature is T1, the water heating device 17 of the continuous-flow water heater 2B is not operated and the water is supplied to the outlet connection 16 at the temperature generated by the water heating device 8. If, on the other hand, the required temperature T2 is higher than T1, the water heating device 17 is operated and the water is supplied to the outlet connection 16 at the temperature generated by the water heating device 17.

The two-stage heating and the provision of two independently controllable water heating devices results in a precise and rapid control of the final outlet temperature.

In addition, the fact that the continuous-flow water heater 2B is arranged in the storage water heater 2A results in a remarkable energy saving. In fact, on one hand, the energy supplied to the storage water heater 2A not only heats the water in the water tank 3, but it keeps the continuous-flow water heater 2B at the temperature T1, which is higher than the ambient temperature, and, on the other hand, the energy supplied to the continuous-flow water heater 2B to raise the water temperature from T1 to T2 is partly recovered once the water heating device 17 of the continuous-flow water heater 2B is deactivated, in the form of residual heat released to the water in the water tank 3.

Furthermore, since the water in the water tank 3 is at atmospheric pressure, the tubular body 12 can be designed and built to only withstand the forces exerted by the pressurised water therein, and the cup-shaped body 4 and the lid 5 do not need to be mutually fluid-tightly coupled.

As a result, the water tank 3 and the tubular body 12 are relatively simple and inexpensive. In particular, the two-stage water boiler 2 is particularly advantageous both for the simplicity of its assembly and because it can easily be inspected and, therefore, enables any maintenance or cleaning operations to be carried out quickly and easily.

The invention claimed is:

1. A two-stage water boiler for a hot beverage vending machine, the two-stage water boiler comprising:
   a storage water heater; and a continuous-flow water heater fluidically connectable in series with the storage water heater and downstream from the storage water heater;

wherein the storage water heater includes:
- a water tank connectable to a water source and configured to contain water at atmospheric pressure;
- a first water heating device arranged in the water tank to heat the water in the water tank;
- a water inlet defining a water inlet of the two-stage water boiler; and
- a water outlet;

wherein the continuous-flow water heater is arranged in the water tank, includes a second water heating device to heat the water flowing through the continuous-flow water heater, and is configured to be supplied, through a water pump and a water inlet of the continuous-flow heater downstream from the water outlet of the storage water heater, with water sucked from the storage water heater, the continuous-flow water heater including a water outlet defining a water outlet of the two-stage water boiler.

2. The two-stage water boiler of claim 1, further comprising:
- a suction duct configured to suck water from the water tank; and
- a delivery duct configured to supply water to the continuous-flow water heater;

wherein the suction duct is connectable with a suction side of the water pump, and the water delivery duct is connectable with a delivery side of the water pump.

3. The two-stage water boiler of claim 2, wherein the suction duct has an inlet arranged in the water tank and an outlet arranged outside the water tank and connectable to the suction side of the water pump, and the delivery duct has an inlet arranged outside the water tank and connectable to the delivery side of the water pump.

4. The two-stage water boiler of claim 1, further comprising a first temperature sensor configured to measure the temperature of the water in the water tank.

5. The two-stage water boiler of claim 1, further comprising a measuring device configured to measure the temperature of the water at the water outlet of the continuous-flow water heater.

6. A water boiler assembly for a hot beverage vending machine, the water boiler assembly comprising:
- the two-stage water boiler of claim 2; and
- a water pump mounted outside the two-stage water boiler and including a suction side connected to the suction duct, and a delivery side connected to the delivery duct;

wherein the water pump is configured to suck water out from the storage water heater and supply the water to the continuous-flow water heater.

\* \* \* \* \*